United States Patent [19]
Haake et al.

[11] Patent Number: 6,124,663
[45] Date of Patent: Sep. 26, 2000

[54] FIBER OPTIC CONNECTOR HAVING A MICROELECTROMECHANICAL POSITIONING APPARATUS AND AN ASSOCIATED FABRICATION METHOD

[75] Inventors: John M. Haake, St. Charles, Mo.; Vijayakumar R. Dhuler, Raleigh; Robert L. Wood, Cary, both of N.C.

[73] Assignees: The Boeing Company, Seattle, Wash.; MCNC, Research Triangle Park, N.C.

[21] Appl. No.: 09/382,790

[22] Filed: Aug. 25, 1999

Related U.S. Application Data

[63] Continuation-in-part of application No. 08/965,277, Nov. 6, 1997, Pat. No. 5,962,949, which is a continuation-in-part of application No. 08/767,192, Dec. 16, 1996, Pat. No. 5,909,078.

[51] Int. Cl.[7] .......................... H03H 37/32; H01L 37/00
[52] U.S. Cl. ............................................................ 310/307
[58] Field of Search ..................................... 310/306, 307

[56] References Cited

U.S. PATENT DOCUMENTS

5,909,078  6/1999  Wood et al. ............................ 310/307
5,962,949  6/1999  Dhuler .................................... 310/307

*Primary Examiner*—Thomas M. Dougherty
*Attorney, Agent, or Firm*—Westerlund & Powell, P.C.; Robert A. Westerlund; Ramon R. Hoch

[57] ABSTRACT

A fiber optic connector is provided that is capable of precisely aligning an optical fiber with another optical element by using a MEMS positioning apparatus subsystem capable of being manufactured in an affordable, repeatable and reliable manner which can precisely microposition an optical fiber relative to another optical element in each of the X, Y and Z directions.

20 Claims, 9 Drawing Sheets

FIBER OPTIC CONNECTOR HAVING A MICROELECTROMECHANICAL POSITIONING APPARATUS AND AN ASSOCIATED FABRICATION METHOD

CROSS-REFERENCE TO RELATED APPLICATIONS

This patent application is a continuation-in-part of U.S. Pat. Appln. Ser. No. 08/965,277, filed Nov. 6, 1997, now U.S. Pat. No. 5,962,949, which was a continuation-in-part of U.S. Pat. Appln. Ser. No. 08/767,192, filed Dec. 16, 1996, now U.S. Pat. No. 5,909,078. +gi

GOVERNMENT RIGHTS

The United States Government may have certain rights to this invention pursuant to a contract awarded by the Department of the Army under contract no. DAAH04-95-C-0007.

FIELD OF THE INVENTION

The present invention relates generally to fiber optic connectors and associated fabrication methods and, more particularly, to fiber optic connectors for precisely aligning an optical fiber with an optical device and associated methods of fabricating such connectors.

BACKGROUND OF THE INVENTION

It is desirable in many applications to precisely align or microposition various objects. Although the precision with which the objects must positioned varies according to the application, the objects must oftentimes be aligned to within several microns to several tenths of microns. One typical application that requires micropositioning relates to the alignment of an optical fiber, such as a single mode optical fiber, with another optical element, such as a laser diode. By appropriately micropositioning an optical fiber relative to a laser diode, for example, a large percentage of the optical signals provided by the laser diode can be coupled to the respective optical fiber.

Proper alignment of the optical fiber is necessary in order to maximize the percentage of light coupled from the light source or electro-optic device to the optical fiber and to thereby increase the transmission efficiency of the optical signals. However, the alignment of optical fibers is complicated by the relatively small sizes of both the optical fiber waveguide, such as a single mode optical fiber, and the light source. Achieving proper alignment becomes even more challenging due to the need to precisely align an optical fiber with another optical element inside a hermetically sealed package in which opto-electronic devices are typically disposed.

Although several micropositioning devices have been proposed for fiber optic connector applications, a need still exists for fiber optic alignment devices that incorporate improved micropositioning techniques. For example, increased demands are being made upon the precision with which objects, such as optical fibers, are aligned. As such, there is a need for more precise alignment devices that provide reliable and repeatable micropositioning to within a few microns to several tenths of microns. In addition, many fiber optic connection applications now require that the optical fibers be micropositioned in not just two directions, but all three orthogonal directions, that is, the X, Y and Z directions. As such, there is also a need for improved fiber optic connectors equipped with alignment devices that can precisely align an optical fiber in each of the X, Y and Z directions. Although the precision with which optical fibers must be aligned is ever increasing, an increasing emphasis is being placed on reducing or at least limiting the cost of the alignment devices used in connection with fiber optic connectors. As such, fiber optic connectors are needed having alignment devices that can be fabricated in an affordable and efficient manner without compromising the alignment precision of the resulting alignment device.

SUMMARY OF THE INVENTION

According to the present invention, a fiber optic connector is provided that is capable of precisely aligning an optical fiber with another optical element by using a microelectromechanical (MEMS) positioning apparatus capable of being manufactured in an affordable, repeatable and reliable manner which can precisely microposition an optical fiber relative to another optical element in each of the X, Y and Z directions.

According to one advantageous embodiment, the inventive fiber optic connector includes a connector housing having sidewalls and a substrate upon which a MEMS positioning apparatus is mounted and adapted for relative movement therewith such that an optical fiber, which is fed into the housing via an aperture in a housing sidewall and is mounted on the MEMS positioning apparatus, can be precisely aligned with another optical element positioned inside the same enclosure.

The MEMS positioning apparatus, as a subsystem of the inventive fiber optic connector, includes a reference surface, a support disposed in a fixed position to the reference surface and a stage that is suspended adjacent to the support and over at least a portion of the reference surface. The stage has opposed first and second major surfaces and defines an XY plane. The stage is suspended over the reference surface, generally by means of one or springs extending between the support and the stage, such that the first major surface faces the reference surface. Typically, the optical fiber to be positioned or aligned is fixed in position upon the second major surface of the stage so that the optical fiber can be precisely positioned by correspondingly moving or positioning the stage. The MEMS positioning apparatus includes first and second MEMS actuators capable of independently moving the stage in the XY plane upon actuation in directions perpendicular to each other. As such, the MEMS positioning apparatus can precisely position the stage in both X and Y directions. The MEMS positioning apparatus subsystem of the inventive fiber optic connector also preferably includes the first and second MEMS actuators as well as an actuator for moving the stage in the Z direction, perpendicular to the XY plane defined by the stage. Thus, the MEMS positioning apparatus of this embodiment can precisely position the stage, and thus the optical fiber mounted thereon, in each of the X, Y, and Z directions relative to the reference surface.

For purposes of the present invention, the terminology "fiber optic connector" is used in a general sense that embraces alignments of optical fibers with optical elements which can be other optical fibers, or optoelectronic devices such as laser diodes, LEDs and photodetectors, and so forth. In the case of alignments with optoelectronic devices, the fiber optic connections made by the invention can be advantageously implemented in optoelectronic packaging, where the alignment of the optical fiber and optoelectronic device can be effected before or after an electronic module housing has been hermetically sealed. The present invention also concerns a method of fabricating the inventive fiber optic connectors.

These and other features, advantages and constructs of the invention will be better understood from the following detailed description with reference to the drawings.

BRIEF DESCRIPTION OF THE DRAWINGS

Corresponding reference characters indicate corresponding parts throughout the drawings. The drawings are not necessarily drawn to scale.

DETAILED DESCRIPTION OF THE PREFERRED EMBODIMENTS

The present invention is directed to improved fiber optic connectors which utilize a MEMS positioning apparatus subsystem that can be fabricated in an affordable, reliable and reproducible manner without compromising the precision alignment provided by the MEMS positioning apparatus subsystem.

Figure 1:
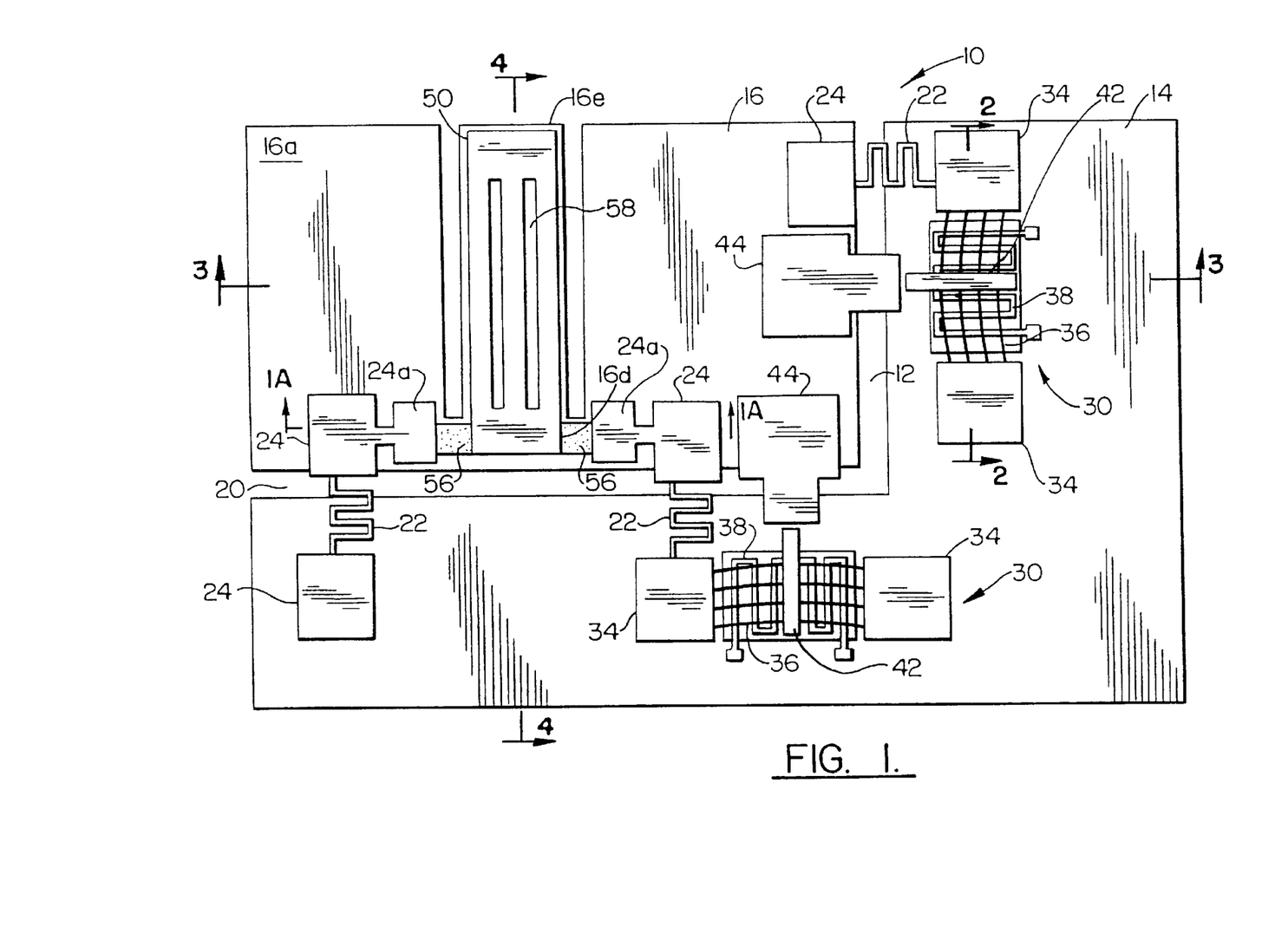
FIG. 1 is a top view of a MEMS positioning apparatus subsystem used in a fiber optic connector according to one embodiment of the present invention, such as the optoelectronic package shown in FIG. 10.

Referring now to FIG. 1, a first embodiment of a MEMS positioning apparatus subsystem 10 used in fiber optic connectors according to the present invention is illustrated. As described herein, the MEMS positioning apparatus subsystem is designed to precisely position an optical fiber with another optical element in optical connectors, such as in hybrid optoelectronic packaging during alignment of an optical fiber with a laser diode or other optical elements.

The MEMS positioning apparatus 10 includes a reference surface 12, a support 14 disposed in a fixed position relative to the reference surface, and a stage 16 suspended adjacent the support and over at least a portion of the reference surface. While the support, the reference surface and the stage can be formed of a variety of materials, the support, the reference surface and the stage are typically formed of the same material, such as silicon, glass or quartz. While the support and the reference surface can be an integral or monolithic structure that is fabricated from the same substrate, the support and the reference surface are typically two separate elements that are disposed or mounted in a fixed position relative to one another. In this regard, the support is generally attached to a reference wafer which forms the reference surface by means of electrostatic bonding, eutectic bonding, glue or the like.

Figure 3:
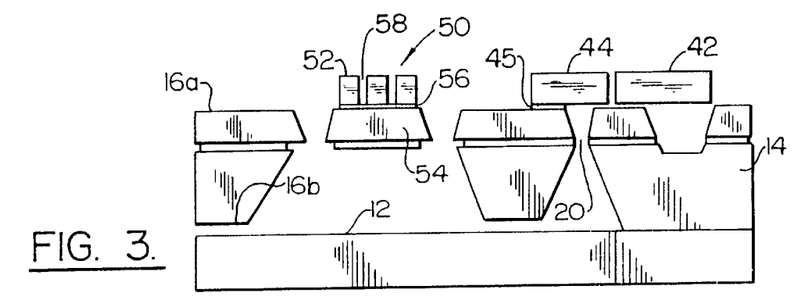
FIG. 3 is a cross-sectional view of the MEMS positioning apparatus subsystem of FIG. 1 taken along line 3—3.
Figure 4:
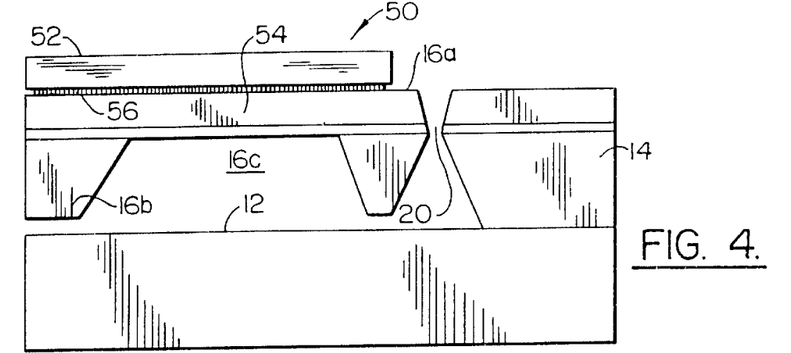
FIG. 4 is a cross-sectional view of the MEMS positioning apparatus subsystem of FIG. 1 taken along line 4—4.

As shown in FIG. 1 and in more detail in the cross-sectional views of FIGS. 3 and 4, the support 14 generally extends upwardly from the reference surface 12 to thereby define a cavity within which the stage 16 is suspended. While the illustrated embodiment of the stage has a generally rectangular shape, the stage can have other shapes without departing from the spirit and scope of the present invention. Regardless of the shape of the stage, however, the support is disposed adjacent to at least one and, more preferably, two sides of the stage. In addition, the support is preferably separated from the stage by a relatively small gap 20, typically at least 10 microns.

The stage 16 preferably has opposed first and second major surfaces 16a, 16b and defines an XY plane as well as a Z axis perpendicular to the XY plane. Although not necessary for the practice of the present invention, the stage is preferably suspended within the cavity defined by the reference surface 12 and the support 14 such that the second major surface of the stage, i.e., the upper surface, is generally coplanar with the upper surface of the support.

The stage 16 is preferably suspended over the reference surface 12 by means of suspension springs 22 that extend or bridge between the support 14 and the stage. As shown in FIG. 1, for example, the suspension springs can extend between a pair of anchors 24, one anchor being placed on the stage and one anchor being placed on the support. The anchors and the suspension springs are preferably formed of a metal, such as nickel or a nickel-phosphorous alloy, that is deposited on the support by means of an electroplating process in order to have a high aspect ratio. As known to those skilled in the art, electroplating techniques include, but are not limited to "LIGA" techniques. The anchors are preferably separated from the stage and the support by means of a dielectric layer, such as silicon nitride, in order to electrically isolate the anchors from the stage and the support.

In order to suspend the stage 16 over the reference surface 12 in a relatively even manner such that the second major surface 16b of the stage is generally parallel and, more preferably, coplanar with the upper surface of the support 14, the MEMS positioning apparatus 10 preferably includes two or more suspension springs 22 that are spaced about the periphery of stage. For example, the suspension springs can extend between the support and respective corners of the stage.

In order to provide movement of the stage 16 relative to the support 14 and, in turn, relative to the reference surface 12, the MEMS positioning apparatus 10 preferably includes an actuator. In order to provide controlled movement of the stage in the X and/or Y directions, the MEMS positioning apparatus preferably includes a first MEMS actuator 30 disposed upon the support adjacent to one side of the stage. As described hereinbelow and as illustrated in FIG. 1, the MEMS positioning apparatus typically includes first and second MEMS actuators disposed upon the support so as to provide controlled movement of the stage in both the X and Y directions. As such, actuation of the first MEMS actuator will move the stage in the X direction, while actuation of the second MEMS actuator will move the stage in the Y direction. Although the MEMS actuators can be designed to provide different amounts of displacement, the MEMS actuators of one advantageous embodiment provide at least 20 microns of displacement in each of the X and Y directions.

A MEMS actuator 30 of one advantageous embodiment is described in U.S. Pat. No. 5,909,078, filed as Ser. No. 08/767,192 entitled "Thermal Arched Beam Microelectromechanical Actuators" filed Dec. 16, 1996 and in U.S. patent application Ser. No. 08/936,598 entitled "Thermal Arched Beam Microelectromechanical Devices and Associated Fabrication Methods" filed Sep. 24, 1997, the contents of both of which are incorporated in their entirety herein. As shown in FIG. 1 and in more detail in FIG. 2, each MEMS actuator includes a pair of spaced apart supports or anchors (hereinafter termed "anchors") 34 on the upper surface of the support. The spaced apart anchors are preferably formed of metal, such as nickel, that is deposited on the upper surface of the support 14, typically by means of the same electroplating process which forms the suspension springs 22 and the associated anchors 24. As shown in FIG. 1, for example, the same structure can serve as an anchor for both a MEMS actuator and a spring.

Each MEMS actuator 30 also includes at least one and, more preferably, a number of arched beams 36 extending between the spaced apart anchors 34. Although a MEMS actuator can have any number and any size of arched beams, the MEMS actuator of one embodiment includes five arched beams which are 5 μm wide, 30 μm tall and 2 mm in length. The arched beams are also typically formed of a conductive material which has a positive coefficient of thermal expansion so that the arched beam expands as the arched beam is heated. In particular, the arched beams are preferably formed of a metal and, more preferably, are formed of nickel or a nickel-phosphorous alloy. As described above in conjunction with the spaced apart anchors, the arched beams are also preferably formed by electroplating so as to have high aspect ratios. For example, the aspect ratio of the arched beams is preferably greater than 1.5:1 and more preferably is about 3:1. As shown in FIG. 1, the arched beams are arched in a direction which preferably extends parallel to the upper surface of the support 14. Although the arched beams are freed from the support, typically by means of a release layer and wet etching as described in U.S. patent application Ser. No. 08/936,598 entitled "Thermal Arched Beam Microelectromechanical Devices and Associated Fabrication Methods" filed Sep. 24, 1997, the arched beams remain anchored at the spaced apart anchors and are arched toward the desired or predetermined direction of motion, i.e., toward the stage 16.

Each MEMS actuator 30 also includes means for applying heat to the arched beams 36. The applied heat causes further arching of the beams as a result of the thermal expansion of the beams. The arching of the beams preferably occurs in the predetermined direction of motion so as to cause displacement of the arched beams in a direction toward the stage 16. While a variety of techniques can be employed to heat the arched beams, the first and second MEMS actuators of the illustrated embodiment include an external heater 38. The external heater extends between first and second opposed ends that commonly serve as contact pads for establishing electrical contact with the heater. As shown in FIG. 1, the heater of one advantageous embodiment winds back and forth in a sinuous path beneath the metallic arched beams such that heat generated by the sinuous heater heats the metallic arched beams in a relatively even fashion.

Although the first and second ends of the heater 38 are disposed on the upper surface of the support 14, a portion of the support underlying the remainder of the heater, i.e., the medial portion of the heater, can be etched or otherwise removed in order to further thermally isolate the heater from the support, as described hereinbelow and as shown in FIG. 3. As shown in FIG. 1, the heater can extend in a cantilevered fashion over the cavity 14a defined within the support or, alternatively, the cavity defined by the substrate may be covered by a diaphragm, typically formed of a dielectric material such as silicon nitride, in order to structurally support the heater while maintaining sufficient thermal isolation between the heater and the support. Although not shown, a medial portion of the heater extending over the cavity defined in the support can be further supported by link, typically also formed of a dielectric material such as silicon nitride, that bridges between the heater and another portion of the upper surface of the support.

As described hereinbelow, the heater 38 generally includes a core 38a formed of an at least partially conductive material having a high resistivity, such as resistivity of at least $5 \times 10^{-6}$ Ω·cm, and a coating 38b formed of a dielectric material surrounding the at least partially conductive material. In one embodiment, the heater includes a core of polysilicon, titanium or tungsten that is surrounded by a coating of silicon nitride or silicon dioxide. As shown in cross-section in FIG. 2, the arched beams 36 are electrically isolated from the at least partially conductive core of the heater by a combination of an air gap 40 and the dielectric coating of the heater. In order to transfer heat generated by the heater to the arched beam in the most efficient manner, the air gap is preferably reduced as much as possible while still maintaining sufficient electrical isolation. In one advantageous embodiment, the air gap is less than 5 microns and, more preferably, between 1 micron and 2 microns. For the embodiment in which the air gap is between 1 micron and 2 microns, the dielectric material covering the portion of the at least partially conductive material that faces the arched beam has a thickness of about 0.25 micron.

Figure 2:
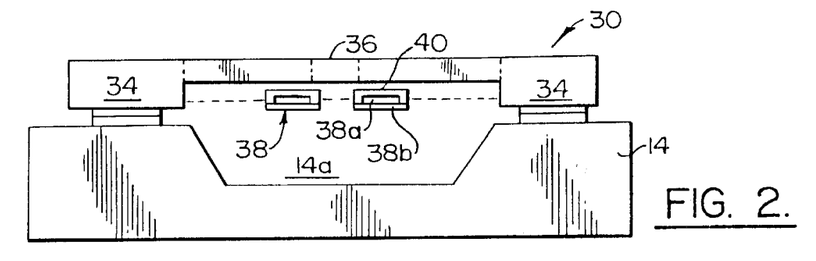
FIG. 2 is a cross-sectional view of the MEMS positioning apparatus subsystem of FIG. 1 taken along line 2—2.

The first and second MEMS actuators 30 of the MEMS positioning apparatus 10 of the present invention each also preferably include a lengthwise extending actuator member 42 coupled to the arched beams 36 and extending outwardly therefrom. The actuator member mechanically couples the plurality of arched beams at a point, typically the midpoint, between the spaced apart anchors 34 as shown in FIGS. 1 and 2. As such, further arching of the arched beams in the predetermined direction displaces the actuator member in the same predetermined direction, i.e., in a direction toward the stage 16. By configuring multiple arched beams in an array, each MEMS actuator enjoys force multiplication so that a large force and a large displacement may be provided. Moreover, by mechanically connecting multiple beams with the actuator member, each MEMS actuator also enjoys a stiffening effect so as to be capable of providing even higher degrees of force than would be available by these same number of individual arched beams operating independently.

Although the first and second MEMS actuators 30 are preferably heated by means of an external heater 38 as described above and shown in FIGS. 1 and 2, either MEMS actuator could, instead, be heated by passing current through the arched beams 36 or by combination of heating created by the external heater and by passing current through the arched beams. In addition, either or both MEMS actuators could be heated by other external heating means, such as a hot plate, an oven, infra red light, radiation or the like. In embodiments in which in the first and second MEMS actuators include respective external heaters, the heaters can take a variety of shapes, such as the sinuous heater shown in FIGS. 1 and 2 or a heater that underlies and is aligned with the actuator member 42, for example.

In order to controllably move the stage 16 in the X and/or Y directions relative to the support 14 and, in turn, to the reference surface 12, the arched beams 36 of the first and second MEMS actuators 30 are heated, such as by passing current through the respective external heaters 38. As such, the arched beams further arch in a predetermined direction toward the stage such that an end portion of the actuator member operably contacts the stage, thereby moving the stage and any objects carried by the stage in the predetermined direction. For example, actuation of the first MEMS actuator will move the stage in the X direction, while actuation of the second MEMS actuator will move the stage in the Y direction.

Instead of directly contacting the stage 16, the actuator member 42 of each MEMS actuator 30 preferably contacts a respective contact member 44 that is disposed in a fixed position upon the stage. As shown in FIGS. 1 and 3, each contact member is preferably positioned along an edge of the stage adjacent a respective MEMS actuator and aligned with the actuator member of the respective MEMS actuator. The contact members are also preferably formed of a metal, such as nickel or a nickel-phosphorous alloy, that is electroplated onto the stage in order to have a high aspect ratio. The contact members are also preferably separated from the stage by means of a dielectric layer 45, such as silicon nitride, in a like fashion to that described above.

Preferably, the spacing between an actuator member 42 and a respective contact member 44 is relatively small in order to reduce the distance that the actuator member must travel prior to contacting the respective contact member and moving the stage 16. Typically, the size of the spacing between an actuator member and a respective contact member is defined by lithography and, in one advantageous embodiment, is 10 microns.

Figure 6:
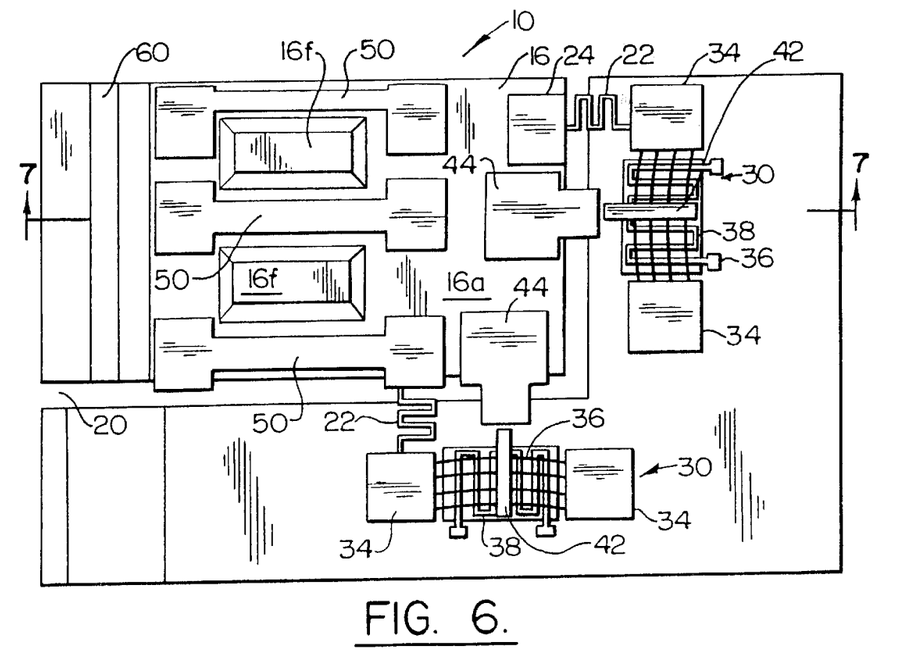
FIG. 6 is a top view of another embodiment of the MEMS positioning apparatus subsystem according to the present invention.

In order to provide movement of the stage 16 in the Z direction, the MEMS positioning apparatus 10 preferably includes another actuator 50 disposed on the stage such that actuation of this actuator bends the stage into contact with the. underlying reference surface 12. Although the MEMS positioning apparatus could include different types of Z actuators, the Z actuator of one advantageous embodiment is a thermal bimorph structure having first and second layers. The first layer 52 is typically formed of a conductive material such as a metal and, more particularly, such as nickel or a nickel-phosphorous alloy, having a relatively large coefficient of expansion. The second layer 54 is formed of a material having a lower or smaller coefficient of expansion than the material forming the first layer. Typically, the first layer is formed of the same material as the other metallic structures, such as the springs and the MEMS actuators, such that the first layer can be deposited during the same electroplating process. As shown in FIG. 6, for example, the same structure can serve as an anchor for a spring and can form a portion of the first layer of a Z actuator. In addition, the material forming the second layer is generally silicon and, in some advantageous embodiments such as shown in cross section in FIGS. 3 and 4, may actually be formed by a portion of the stage itself.

Upon heating the thermal bimorph structure that forms the Z actuator 50, the first and second layers expand in different amounts or to different degrees due to the different coefficients of thermal expansion of the materials forming the first and second layers, respectively. As a result of this differential expansion, the Z actuator bends in a controlled fashion. In order to force the Z actuator to bend downwardly toward the underlying reference surface 12, the first layer 52 formed of the material having the larger coefficient of expansion is preferably disposed upon or on top of the second layer 54 that is formed of the material having a lower coefficient of expansion as shown in FIGS. 3 and 4.

Figure 5:
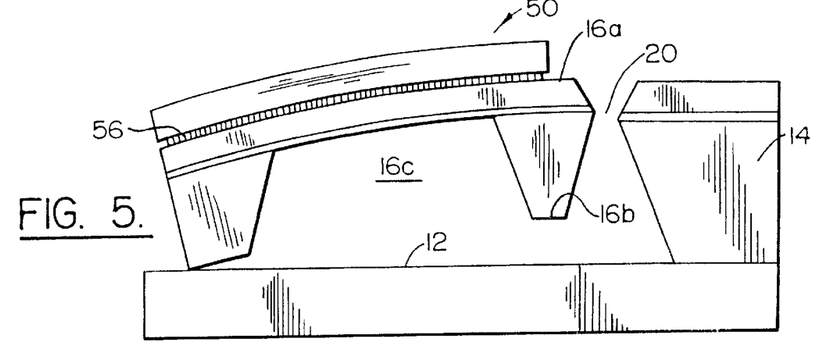
FIG. 5 is a cross-sectional view of the MEMS positioning apparatus subsystem of FIG. 1 taken along line 4—4 that illustrates the elongate tongue portion.

The thermal bimorph structure of the Z actuator 50 can be heated in a variety of manners as known to those skilled in the art. For example, current can be passed directly through the first layer formed of the more conductive material. As illustrated, however, the Z actuator can also include a heater 56 disposed between the first and second layers. While the heater can be fabricated from a variety of materials, the heater of one advantageous embodiment includes a core 56*b* formed of an at least partially conductive material having a high resistivity, such as resistivity of at least $5\times10^{-6}$ $\Omega\cdot$cm, and a coating 56*a*, 56*c* formed of a dielectric material surrounding the at least partially conductive material. In one embodiment, the heater includes a core of polysilicon, titanium or tungsten that is surrounded by a coating of silicon nitride or silicon dioxide. By passing current through the heater, the heater heats the first and second layers which expand in different amounts so as to cause the Z actuator to bend. In the embodiment of the MEMS positioning apparatus illustrated in FIG. 1, for example, the Z actuator will bend downwardly as shown in FIG. 5 so as to contact the underlying reference surface 12 and lift the remainder of the stage 16 upwardly.

Figure 1A:
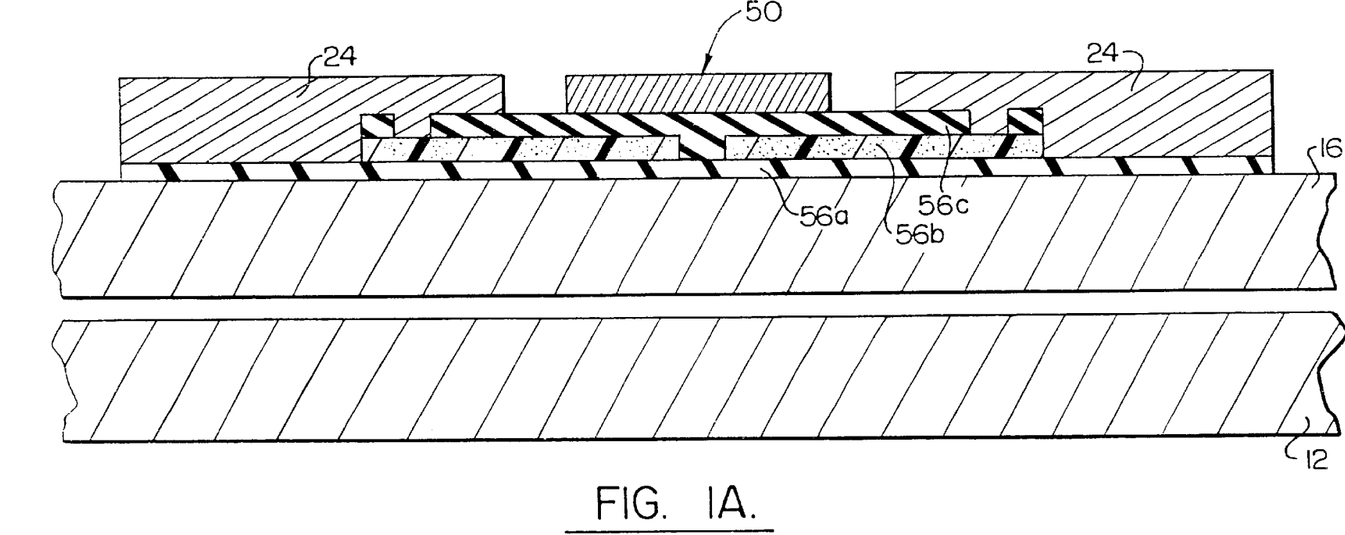
FIG. 1A is a cross-sectional view of a portion of the MEMS positioning apparatus subsystem of FIG. 1 taken along line 1A—1A.

As shown in FIG. 1, the heater 56 is preferably deposited upon the stage 16 so as to extend beyond the Z actuator 50. In particular, opposite ends of the heater preferably extend beyond the Z actuator to respective contact pads 24*a* for establishing electrical contact with the heater. In this regard, the contact pads are preferably disposed upon a portion of the stage near the Z actuator in order to minimize electrical losses. As shown in FIG. 1A, the dielectric coating 56*c* preferably defines an opening underlying each contact pad for permitting the conductive material of the contact pad to contact the core 56*b* of the heater.

The contact pads 24*a* are typically formed of a conductive material, such as nickel or a nickel-phosphorous alloy. Moreover, in one advantageous embodiment, the contact pads are extensions of respective ones of the suspension spring anchors 24. As such, electrical contact can be established with the contact pads via the suspension springs 22 by means of the corresponding suspension spring anchors that are disposed upon the support 14.

In order to facilitate bending of the stage 16 in a controlled fashion, a portion of the stage that underlies the Z actuator 50 is preferably etched to define a recessed portion 16*c* opening through the first major surface 16*a* of the stage that faces the underlying reference surface 12. As such, actuation of the Z actuator will primarily cause the recessed portion of the stage to bend.

In the embodiment shown in FIG. 1, for example, the stage 16 defines an elongate tongue portion that is attached to the remainder of the stage at a proximal end 16d and is otherwise separated from the stage. According to this embodiment, the Z actuator 50 is disposed at least partially upon the elongate tongue portion such that actuation of the Z actuator bends the elongate tongue portion downwardly toward the underlying reference surface 12. As such, the portion of the stage underlying the medial portion of the elongate tongue portion is preferably recessed as shown in FIGS. 4 and 5 to facilitate the bending of the elongate tongue portion upon actuation of the Z actuator.

Preferably, the Z actuator 50 is actuated until the lower surface 16b of the stage 16 contacts the reference surface 12, thereby lifting the remainder of the stage upwardly, i.e., in the Z direction, as shown in FIG. 5. As will be apparent to those skilled in the art, those portions of the stage which are not recessed, i.e., the thicker portions of the stage, will typically contact the underlying reference surface upon actuation of the Z actuator. For example, the distal portion 16e of the Z actuator of the MEMS positioning apparatus 10 of FIG. 1 is preferably the full thickness of the stage such that upon actuation of the Z actuator, the medial portion of the Z actuator bends, thereby deflecting the distal portion of the Z actuator downwardly and into contact with the reference surface such that further actuation of the Z actuator will lift the remainder of the stage upwardly. As such, any object carried by the stage will also be lifted upwardly in a controlled fashion.

In order to further increase the flexibility of the Z actuator 50, the first layer 52 of the Z actuator that is formed of the more conductive material can define one or more slits 58 that generally extend lengthwise along the Z actuator. In addition, in the embodiment of the MEMS positioning apparatus 10 of FIG. 1 in which the Z actuator extends in a cantilevered fashion from the remainder of the stage, the dimensions of the Z actuator can also be varied in order to correspondingly vary the flexibility of the Z actuator.

Figure 7:
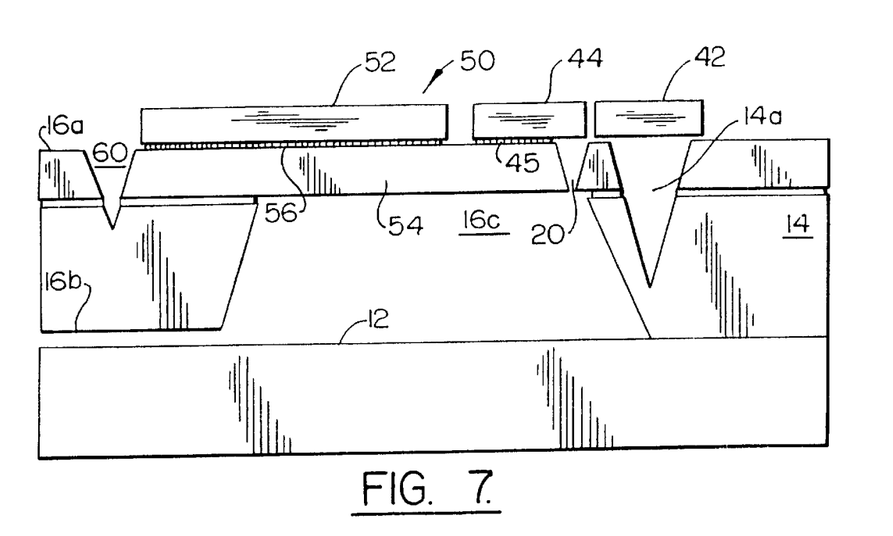
FIG. 7 is a cross-sectional view of the MEMS positioning apparatus subsystem of FIG. 6 taken along line 7—7 prior to actuation of the Z actuator.
Figure 8:
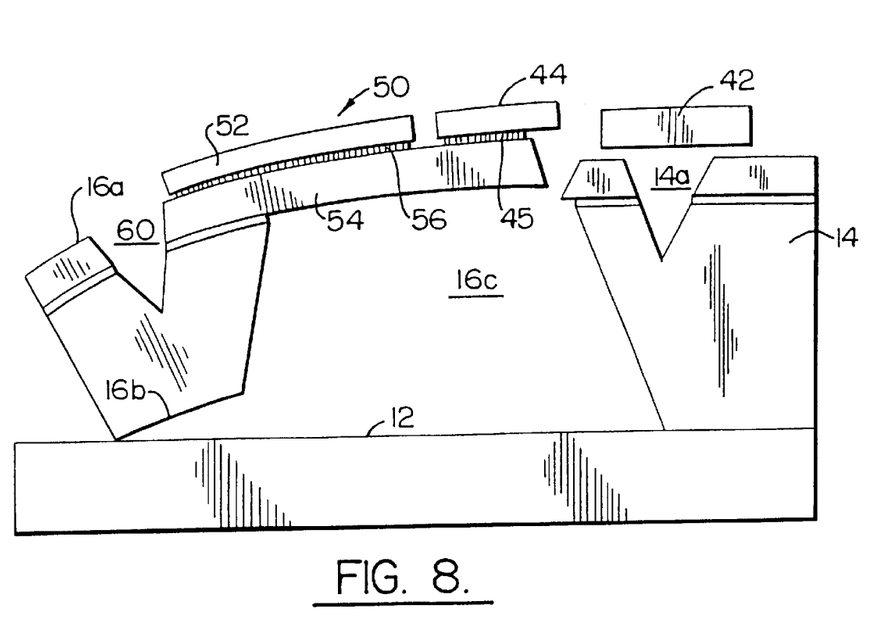
FIG. 8 is a cross-sectional view of the MEMS positioning apparatus subsystem of FIG. 6 taken along line 7—7 following to actuation of the Z actuator.

As shown in FIGS. 6 and 7, the MEMS positioning apparatus 10 of another embodiment can include multiple Z actuators 50. According to this embodiment, the Z actuators are generally disposed upon the upper surface 16b of the stage 16 so as to extend in parallel across a portion of the stage. As such, concurrent actuation of the multiple Z actuators will further increase the bending force which bends at least a portion of the stage downwardly into contact with the reference surface 12. As shown in FIG. 8, actuation of the Z actuators 50, such as by passing current through the heaters 56 that are positioned between the first and second layers of the respective Z actuators, will cause a recessed portion of the stage to bend until those portions of the stage which are not recessed, i.e., the thicker portions of the stage, contact the underlying reference surface 12. For example, the edge portion of the stage of the MEMS positioning apparatus of FIG. 6 is preferably the full thickness such that upon actuation of the Z actuators, the recessed portion of the stage is bent, thereby deflecting the edge portion of the stage downwardly and into contact with the reference surface such that further actuation of the Z actuators will lift the remainder of the stage upwardly. See FIG. 8. As such, any object carried by the stage will also be lifted upwardly in a controlled fashion.

While a single heater 56 is shown to pass between the first and second layers of each of the Z actuators 50 in the embodiment of FIG. 6, each Z actuator can include a separate heater, if so desired. As such, the Z actuators could be heated and, therefore, actuated in different amounts. In addition to including a recessed portion 16c that opens through the first major surface 16a of the stage 16, i.e., the lower surface of the stage, the stage can define one or more openings 16f as shown in FIG. 6 so as to further increase the flexibility of the stage.

As a result of the controlled movement of the stage 16 in the X, Y and Z directions, the MEMS positioning apparatus 10 of the present invention can precisely position objects placed upon the stage in a precisely controlled and reliable fashion. For example, the MEMS positioning apparatus can align objects to within 0.2 microns. As such, the MEMS positioning apparatus can be utilized in a wide variety of applications, such as micro-positioning applications, manipulation of microbiological specimens, optical fiber alignment or the like. With respect to optical fiber alignment applications, the stage can define a groove 60, typically a V-shaped groove, for receiving and securely holding an optical fiber as shown in FIGS. 5 and 6. As such, movement of the stage will also move the optical fiber in a like manner. The MEMS positioning apparatus can therefore precisely align an optical fiber, such as a single mode optical fiber, with a laser diode or other optical element.

Figure 9:
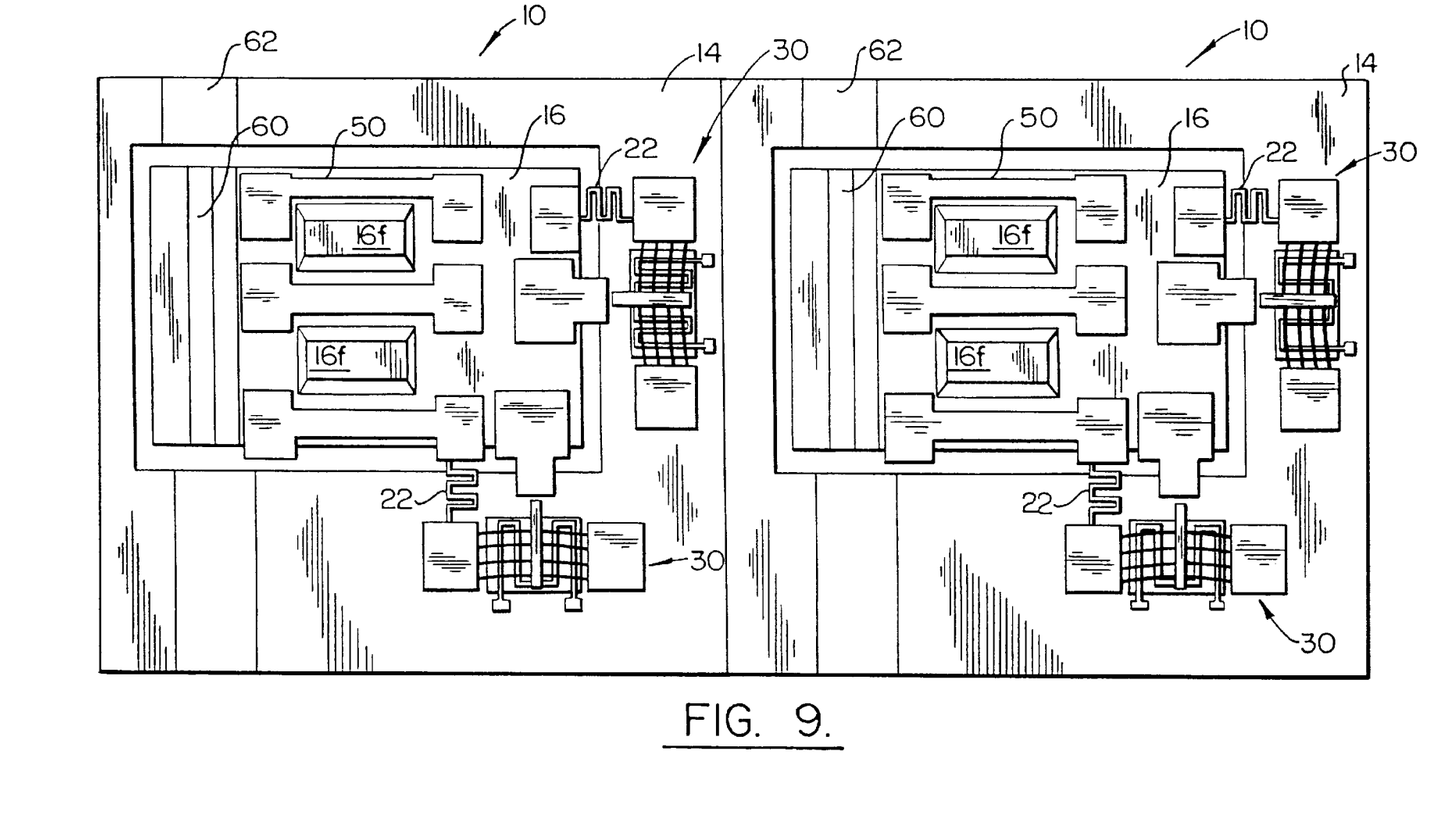
FIG. 9 is a top view of a pair of MEMS positioning apparatus subsystem fabricated on the same substrate according to one embodiment of the present invention.

As shown in FIG. 9, multiple MEMS positioning apparatuses 10 can be formed upon a single substrate in order to provide concurrent alignment of a number of objects. For example, the multiple MEMS positioning apparatuses can align a plurality of optical fibers with respective laser diodes or other optical elements. As also shown in FIG. 9, the laser diodes or other optical elements are also preferably mounted in fixed positions 62 relative to the substrate. By defining the positions at which the laser diodes or other optical elements will be mounted prior to the fabrication of the MEMS positioning apparatus, the subsequent fabrication process can utilize the predefined positions for reference purposes in order to insure that each MEMS positioning apparatus is fabricated in general or coarse alignment with the respective laser diode or other optical element. Preferably, the coarse alignment provided by the fabrication process insures that any initial misalignment of the optical fiber carried by the stage with respect to the laser diode or other optical element will be less than the range of motion of the MEMS positioning apparatus, i.e., less than 20 microns in each of the X, Y and Z directions, for example. By controllably actuating the respective actuators of the MEMS positioning apparatus, the optical fiber carried by the stage can then be precisely aligned with the laser diode or other optical element. Although the foregoing alignment process is described above in conjunction with the alignment of an optical fiber, the MEMS positioning apparatus of the present invention can align a variety of other objects in a similar manner.

Although not necessary for the practice of the present invention, the stage 16 and the support 14 are preferably formed of a silicon on insulator (SOI) wafer. As shown by the cross-sectional drawings, the SOI wafer includes an upper layer of single crystal silicon, an intermediate layer of oxide having a thickness of approximately 0.5 microns to about 1 micron, and a lower layer of a bulk substrate material, such as silicon, that is generally much thicker than the other layers. As described above, the support is, in turn, generally bonded to the reference surface 12 defined by a reference wafer.

The first and second MEMS actuators 30 are preferably fabricated upon the SOI wafer according to the process described by co-pending U.S. patent application Ser. No. 08/936,598 entitled "Thermal Arched Microelectromechanical Devices and Associated Fabrication Methods" filed Sep. 24, 1997. As described therein, the suspension springs 22 and associated anchors 24, the contact pads 24a as well as the first layer 52 of the conductive material of the Z actuator 50 can be cofabricated with the arched beams 36 and spaced apart anchors 34 of the first and second MEMS actuators during a common electroplating step. In addition, the heater 56 that heats the first and second layers of the Z actuator is preferably cofabricated with the heaters 38 of the first and second MEMS actuators. As a result of the construction of the MEMS positioning apparatus can also be fabricated in an affordable, reliable and reproducible manner without compromising the precision alignment provided by the MEMS positioning apparatus.

Figure 10:
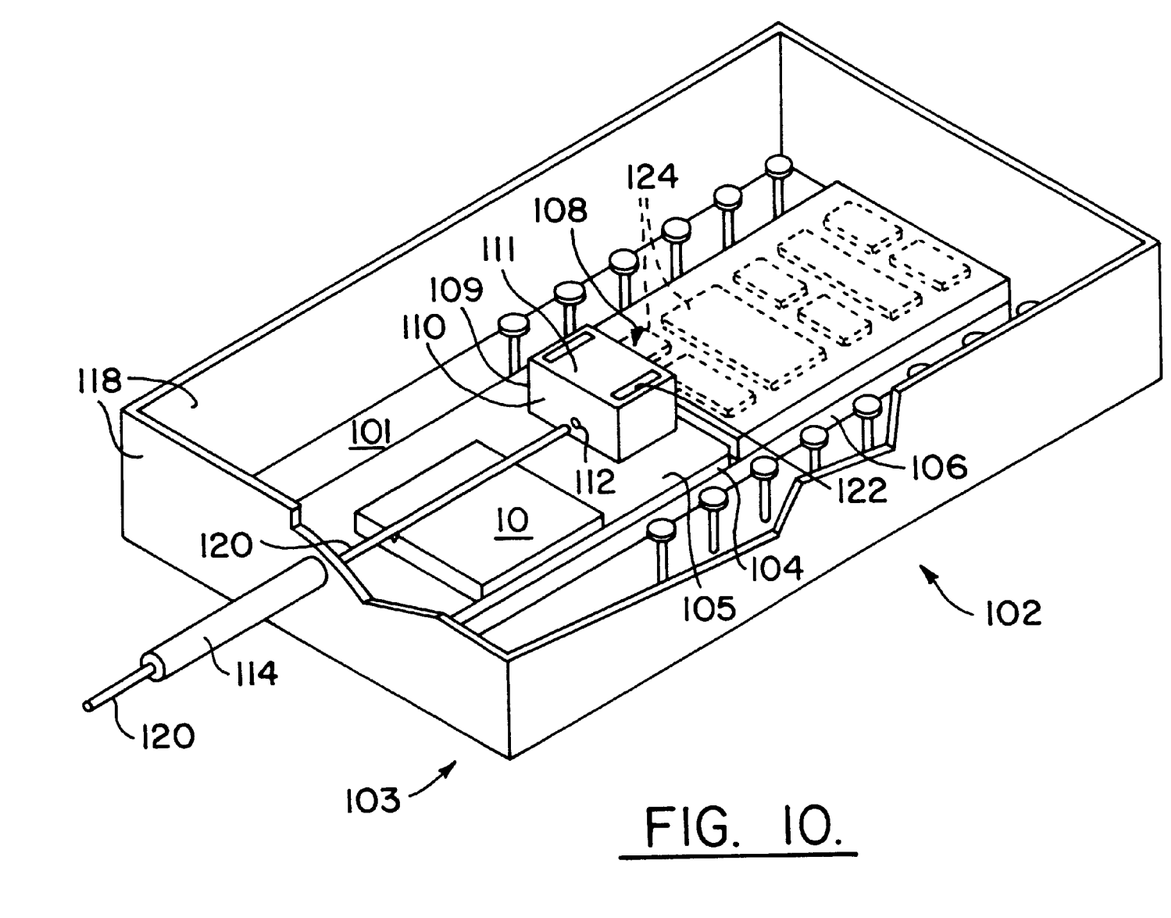
FIG. 10 is a pictorial diagram illustrating an optoelectronic hybrid package incorporating a fiber optic interface formed using a MEMS positioning apparatus subsystem according to FIG. 1.

Referring to FIG. 10, a pictorial diagram is provided illustrating an exemplary optoelectronic hybrid package 102 incorporating a fiber optic interface aligned using the MEM positioning apparatus subsystem described above 10. The hybrid package 102 may be an optical receiver or optical transmitter for sake of this illustration, but it is not limited thereto.

The optoelectronic hybrid package 102 illustrated in FIG. 1 has an enclosure 101 (i.e., the connector housing) defined by sidewalls 118 including a header assembly 103 and having a device floor 106. A substrate 104 is mounted on the device floor 106, and the substrate 104 forms an integral base for both the MEMS positioning apparatus subsystem 10, and device submount 108, each of which is described in greater detail below. The substrate 104 is preferably a ceramic substrate, which serves as a heat sink that disperses heat generated by electronic circuitry mounted on the substrate 104. The device submount 108 is mounted atop the substrate 104. The device submount 108 includes a block 109 and the optoelectronic device 112 mounted on a side 110 of the block 109. Two device terminals 122 reside on the top surface 111 of device submount 108, and the device terminals are electrically connected to the optoelectronic device 112. The optoelectronic device 112 is a light transmitter, such as a light-emitting diode (LED) or a laser diode, when the hybrid package 102 is an optical transmitter. Alternatively, the optoelectronic device 112 is a light detector, such as a PIN photodiode, when the hybrid package 102 is an optical receiver.

In either case, a cylindrical hermetic feedthrough 114 leads to an aperture 107 formed in the package sidewall 118 in alignment with the optoelectronic device 112. The hermetic feedthrough 114 is preferably a KOVAR tube with a gold-plated interior that is braised to the sidewall 118 of the package. An optical fiber 120 extends through the hermetic feedthrough and the aperture 107. The hermetic feedthrough is more fully disclosed in U.S. Pat. No. 5,692,086, the subject matter of which is incorporated herein by reference. Preferably, the optical fiber 120 is a commercially available sleeved gold metallized optical fiber. The sleeving (not shown) is preferably a high-temperature plastic that is physically and chemically stable over a wide temperature range.

MEMS positioning apparatus subsystem 10 can be first bonded into the package 102 using standard optoelectronic placement techniques within the actuator range (viz., about 10 $\mu$m). The laser diode of the device submount 108 can be mounted on the non-moving portion of the substrate 104 using passive LIGA stops to pre-position the laser in front to the fiber. After the MEMS positioning apparatus subsystem 10 is placed into the package 102, the optical fiber 120 or other optical component can be brought in and bonded into the fiber holding structure (e.g., v-groove or LIGA channel) of the MEMS positioning apparatus subsystem 10. After the optical fiber 120 is bonded, the MEMS positioning apparatus subsystem 10 can be actuated via microprocessor control to align the fiber to the laser diode 112. The geometry of the inventive MEMS positioning apparatus subsystem 10 brings the optical elements into precise alignment.

The control circuitry for the MEMS positioning apparatus subsystem 10 can be located either inside the optoelectronic module, or in an adjacent electronic package on the same printed circuit board where the optoelectronic module is residing. Once installed, the MEMS positioning apparatus subsystem 10 is hermetically sealed within the enclosure 101 inside the metal optoelectronic module housing 102 with a hermetic sealed cover by sealing techniques in the art. In aligning the optical fiber 120 with the optoelectronic device 112, the alignment system can employ a subsystem, not shown but can be of a type generally known in the art, for measuring the amount of light transmitted between the optical fiber 120 and the optoelectronic device 112. The basic approach is to measure light transmitted from the optoelectronic device 112 into the optical fiber 120, or, alternatively, from the optical fiber 120 to the optoelectronic device 112, and appropriately manipulating the position of the optical fiber 120 using MEMS positioning apparatus subsystem 10 as based on the light measurements to maximize the amount of transmitted light. The three-axis actuators, described above, of the MEMS positioning apparatus subsystem 10 can be powered via conventional wirebonding, such that described in U.S. Pat. No. 5,602,955, which teachings are incorporated herein by reference.

In this basic way, the present invention employs the internal MEMS positioning apparatus subsystem 10 to effectuate precise optical alignment, i.e., on a micrometer level, of the optical fiber 120 and optoelectronic device 112. Once aligned with optical device 112, the optical fiber 120 can be locked into position, if desired, by any appropriate technique, such as epoxy bonding or solder bonding of the fiber 120 to the substrate 104 or some other fixture inside package 102 (e.g., see U.S. Pat. Nos. 5,692,086 and 5,745,624), as long as the locking technique does not disturb the alignment already established between the optical fiber 120 and optoelectronic device 112.

FIG. 1 also illustrates the circuitry 124 housed within the hybrid package 102. The circuitry 124 is added after aligning the optical fiber 120. Prior to installation of the circuitry 124, a hybrid package 102 is commonly referred to as an optical header assembly.

As can be appreciated from this illustration, the inventive fiber optic connectors eliminate the need for expensive external automated fiber alignment systems. The inventive MEMS positioning devices are small devices than can fit into virtually any current package or experimental set-up. The inventive devices eliminate the need for manual alignment procedures by low capitalized companies or researchers, and eliminates the need for high volume manufacturers to purchase many varied external automated fiber alignment systems. Many simultaneous in-package alignments of fiber optic and micro-optic components can be achieved using the inventive MEMS positioning apparatus subsystem 10 in the package by using a simple desk top computer and array of detectors for control. This can significantly reduce the cost of all fiber optically pigtailed components.

In addition to a hermetically sealed package, one or more MEMS positioning apparatus subsystem 10 can also be disposed within a fiber optic connector of the type as described in commonly assigned U.S. Pat. No. 5,606,635, the contents of the latter of which are expressly incorporated herein in their entirety. In that embodiment, the MEMS positioning apparatus subsystem 10 can precisely align optical fibers with respective lens elements of the fiber optic connector in order to collimate the optical signals transmitted therethrough.

Other fiber optic connector implementations of the inventive MEMS positioning technology are also contemplated and encompassed. For instance, in another embodiment of this invention shown in FIG. 11A, a fiber optic connector is embodied as a silicon dioxide waveguide switch 130 provided for aligning fiber optics 131' formed in a stage 16, as the movable platform as described above but having a particular geometry shown in FIG. 11B, with separate fiber optics 131" provided on support 14, as a stationary platform as described above. As shown in FIG. 11B, waveguide 133 has silicon dioxide surface region 134 formed on a silicon substrate 135 as stage 16, which incorporates the fiber optics 131'. That is, the support 14 can be a silicon wafer that provides a substrate in which the silicon dioxide waveguide can be processed. The springs 22, spring anchors 24, arch beams 36, arch anchors 34, actuator member 42 and contact member 44 shown in FIG. 11A represent the same features described above for the first and second MEMS actuators 30 of the MEMS positioning apparatus subsystem 10.

These waveguides can be processed such that they are separated by the bulk micromachined separation gap or channel 20. These waveguides can be processed such that when that when an in-plane (X or Y direction) microactuator 30, the same as described above, is actuated, light can be switched from one waveguide to the next.

Figures 11A, 11B:
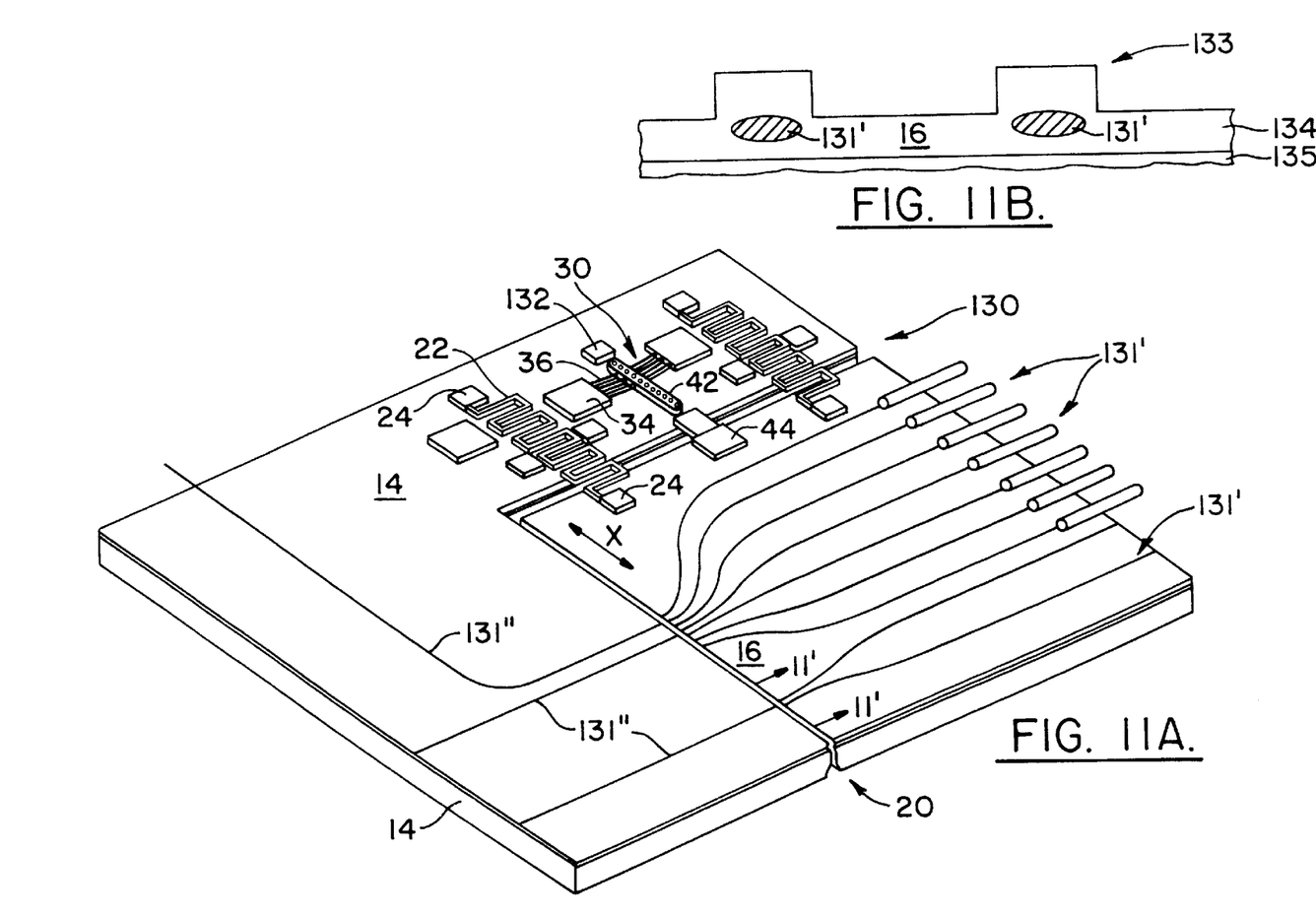
FIG. 11A is a perspective view of a fiber optic connector using a MEMS positioning apparatus according to another embodiment of the invention for aligning fiber optics of a $SiO_2$ waveguide switch.
FIG. 11B is a cross-section view taken along section 11'—11' indicated in FIG. 11A.

As also shown in FIG. 11A, a backstop 132 is located on support 14 behind the distal end of actuator member 42 opposite from contact 44, respectively, to delimit the amount of return movement of the actuator member 42 after distension to help prevent any buckling in the arches 36 when the actuator member 42. This backstop 132 can optionally be used in a similar manner with the X and/or Y direction MEMS actuators 30 for any of the embodiments of the MEMS positioning apparatus subsystem 10 described herein.

The waveguide switch 130 shown in FIG. 11A only needs to provide x-axis (or y-axis) displacement to provide the desired function, and it can be made very small in size, such as with side edge lengths of 4 mm×4 mm, or even smaller. Alternatively, the inventive micro-aligner can be used as a multimode or single mode fiberoptic switch, such as for Local Area Networks (LAN).

Figure 12:
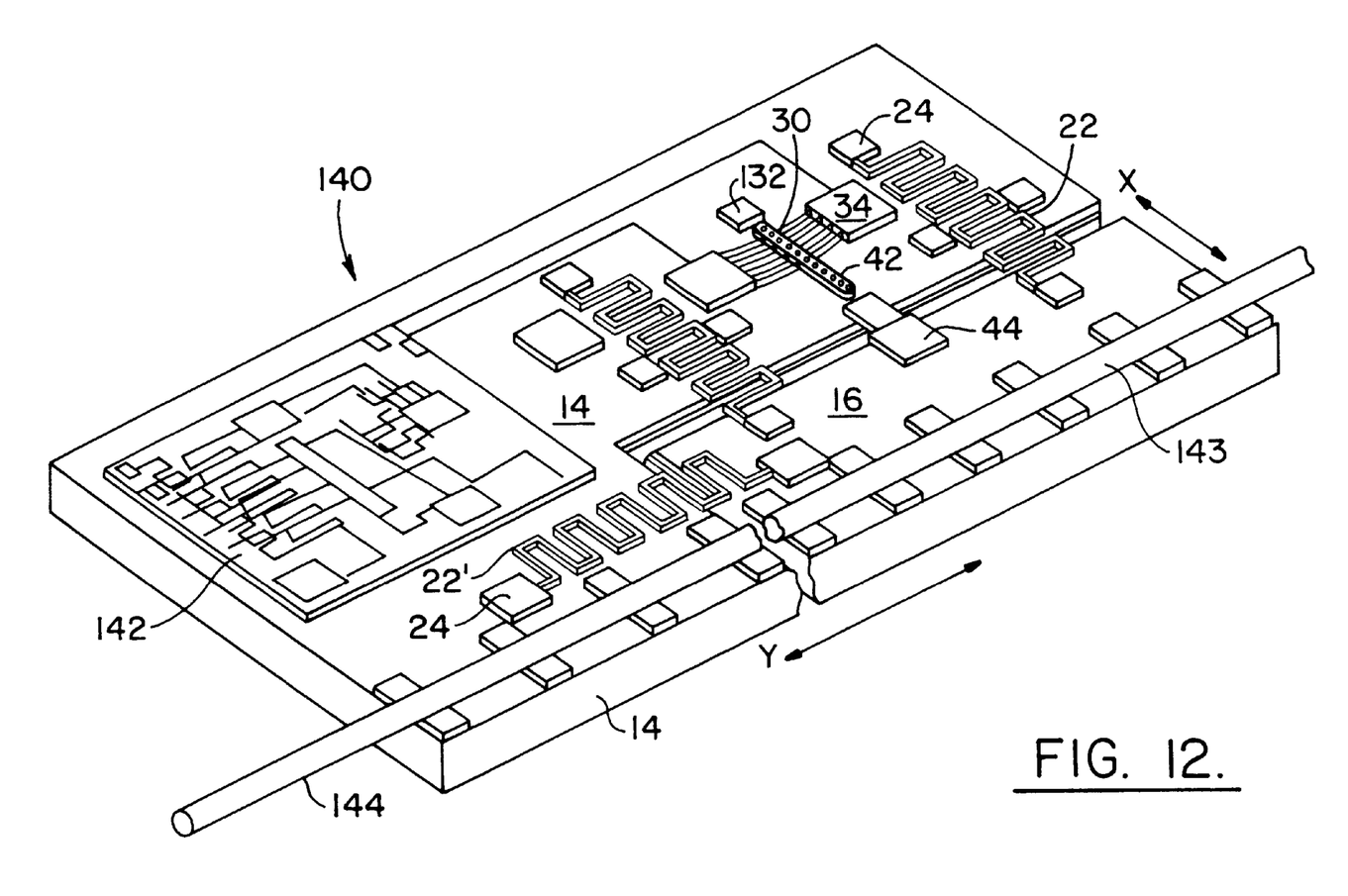
FIG. 12 is a perspective view of a fiber optic connector using a MEMS positioning apparatus according to another embodiment of the invention for aligning two fiber optics of a multimode fiber switch.

In yet another embodiment of this invention as shown in FIG. 12, a fiber connector is embodied as a multimode fiber switch 140 with on-board control electronics 141 is provided using an x-axis (in-plane) MEMS actuator 30 of a basic construction already described herein, for aligning moving optical fiber 143 held on movable stage 16 to stationary optical fiber 144 positioned on stationary support 14. the optical fibers 143 and 144 are shown as mounted on LICA channel 145, but an etched v-groove also is applicable. Return spring 22' provides stability to the y-direction position of the movable stage 16 while the MEMS actuator 30 is actuated to alter the X-direction position of the movable fiber 143. The multimode fiber switch 140 can be made very small in size, such as with side edge lengths of 3 mm×1.5 mm, or even smaller.

In view of the above, it will be, seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A fiber optic connector, comprising:
   a first optical element;
   a support disposed in a fixed position relative to a reference surface;
   a stage defining an XY plane and suspended adjacent said support and over at least a portion of the reference surface;
   a second optical element disposed in a fixed relation to said stage; and
   a first microelectromechanical actuator comprising:
      spaced apart anchors disposed in a fixed position relative to said support;
      an arched beam extending between said spaced apart anchors; and
      an actuator member operably coupled to said arched beam and extending outwardly therefrom for moving said stage in the XY plane upon actuation of said first microelectromechanical actuator for aligning the second optical element with the first optical element.

2. The fiber optic connector according to claim 1, wherein the first optical element is selected from the group consisting of an optoelectronic device and an optical fiber.

3. The fiber optic connector according to claim 1, wherein the first optical element is selected from the group consisting of a laser diode, a light emitting diode, and a photodiode.

4. The fiber optic connector according to claim 1, wherein the second optical element comprises an optical fiber.

5. The fiber optic connector according to claim 1, wherein the fiber optic connector comprises a waveguide switch.

6. The fiber optic connector according to claim 1, wherein the fiber optic connector comprises a single mode fiber optic switch.

7. The fiber optic connector according to claim 1, wherein the fiber optic connector comprises a multimode fiber optic switch.

8. The fiber optic connector according to claim 1, wherein said first micromechanical actuator further comprises means for heating said arched beam to cause further arching of said beam such that said actuator member controllably positions said stage in the XY-plane.

9. The fiber optic connector according to claim 1, further comprising a second micromechanical actuator for positioning said stage in the XY-plane in a direction perpendicular to the direction of movement created by said first micromechanical actuator.

10. The fiber optic connector according to claim 1, wherein said stage comprises a contact member disposed in a fixed position upon said stage and positioned such an end of said actuator member contacts said anchor member upon actuation of said first microelectromechanical actuator.

11. The fiber optic connector according to claim 1, wherein said stage has first and second major surfaces and is suspended such that the first major surface faces the reference surface, wherein the first major surface of said stage includes a recessed portion, and wherein the microelectromechanical positioning apparatus further comprises an actuator disposed on said stage and at least partially overlying the recessed portion of said stage such that actuation of said actuator bends said stage toward the underlying reference surface to thereby move said stage in a Z direction perpendicular to the XY plane.

12. The fiber optic connector according to claim 11, wherein said actuator disposed on said stage comprises a thermal bimorph structure comprised of first and second layers, and wherein said first layer has a larger coefficient of expansion than the second layer.

13. The fiber optic connector according to claim 1, further comprising a backstop structure provided on said support at a location behind an end of said actuator member opposite from said stage.

14. The fiber optic connector according to claim 1, further comprising at least one spring extending between said support and said stage for suspending said stage above said support.

15. The fiber optic connector according to claim 1, wherein second optical element is held in a fixed relation on said stage by an optical fiber holding means selected from the group consisting of a groove and a LIGA channel.

16. A fiber optic connector including an optoelectronic device housed inside an optoelectronic package, comprising:
   an enclosure having sidewalls and a substrate;
   a microelectromechanical positioning apparatus mounted on said substrate, said micromechanical positioning apparatus comprising:
      a support disposed in a fixed position relative to a reference surface;
      a stage defining an XY plane and suspended adjacent said support and over at least a portion of the reference surface;
      a first microelectromechanical actuator comprising:
         spaced apart anchors disposed in a fixed position relative to said support,
         an arched beam extending between said spaced apart anchors, and
         an actuator member operably coupled to said arched beam and extending outwardly therefrom for moving said stage in the XY plane upon actuation of said first microelectromechanical actuator for aligning the second optical element with the first optical element;
   an optoelectronic device housed inside the enclosure;
   an optical fiber fed into the enclosure via an aperture in a sidewall of the enclosure and mounted on the stage of the microelectromechanical positioning apparatus;
   wherein the microelectromechanical positioning apparatus is capable of moving the optical fiber into optical alignment with the optoelectronic device inside the enclosure.

17. The fiber optic connector according to claim 16, wherein the optoelectronic device is selected from the group consisting of a laser diode, a light emitting diode, a photodiode, and an optical fiber.

18. The fiber optic connector according to claim 16, wherein said stage has first and second major surfaces and is suspended such that the first major surface faces the reference surface, wherein the first major surface of said stage includes a recessed portion, and wherein the microelectromechanical positioning apparatus further comprises an actuator disposed on said stage and at least partially overlying the recessed portion of said stage such that actuation of said actuator bends said stage toward the underlying reference surface to thereby move said stage in a Z direction perpendicular to the XY plane, and wherein said actuator disposed on said stage comprises a thermal bimorph structure comprised of first and second layers, where said first layer has a larger coefficient of expansion than the second layer.

19. The fiber optic connector according to claim 16, further comprising a second micromechanical actuator for positioning said stage in the XY-plane in a direction perpendicular to the direction of movement created by said first micromechanical actuator; and
   a backstop structure provided on said support at a location behind an end of an actuator member opposite from said stage for at least one of said first and second micromechanical actuators.

20. A method of fabricating a fiber optic connector comprising an optoelectronic device housed inside an optoelectronic package, comprising the steps of:
   providing an optoelectronic package including:
      an enclosure having sidewalls and a substrate;
      a microelectromechanical positioning apparatus mounted on said substrate, said micromechanical positioning apparatus comprising:
         a support disposed in a fixed position relative to a reference surface;
         a stage defining an XY plane and suspended adjacent said support and over at least a portion of the reference surface;
         a first microelectromechanical actuator comprising:
            spaced apart anchors disposed in a fixed position relative to said support,
            an arched beam extending between said spaced apart anchors, and
            an actuator member operably coupled to said arched beam and extending outwardly therefrom for moving said stage in the XY plane upon actuation of said first microelectromechanical actuator;
   an optoelectronic device housed inside the enclosure;
   feeding an optical fiber fed into the enclosure via an aperture in a sidewall of the enclosure;
   holding the optical fiber on the stage of the microelectromechanical positioning apparatus; and
   controllably positioning the stage relative to the support by actuating the microelectromechanical positioning apparatus, and precisely aligning the optical fiber with the optoelectronic device.

* * * * *